W. H. WASHBURNE.
INTERNAL COMBUSTION ENGINE.
APPLICATION FILED JUNE 3, 1916.
1,257,162.
Patented Feb. 19, 1918.
2 SHEETS—SHEET 2.
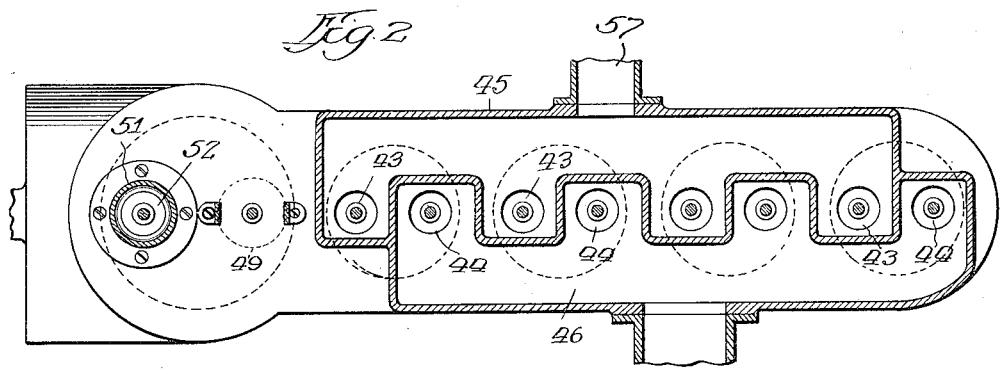
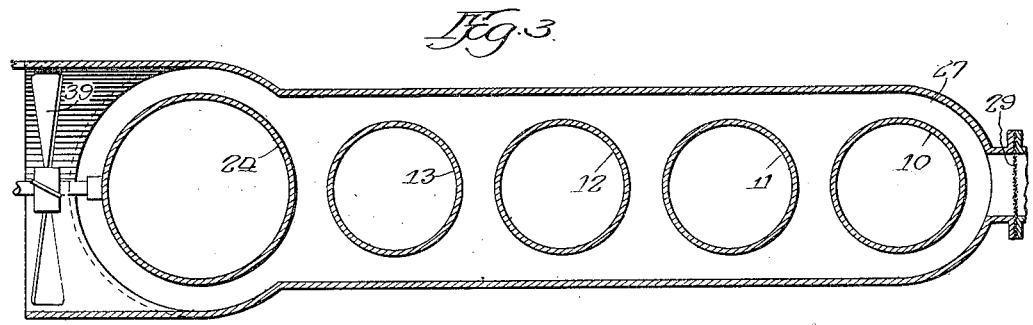
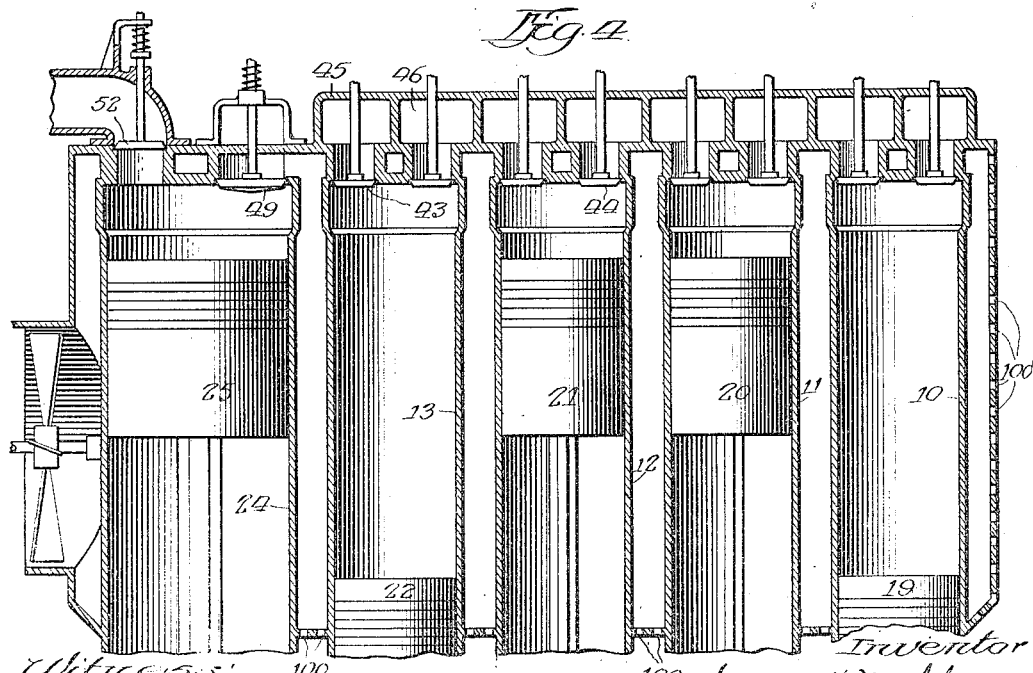
Inventor
William H. Washburne
By Walter M. Fuller Atty.
Witness:
Geo. C. Davison

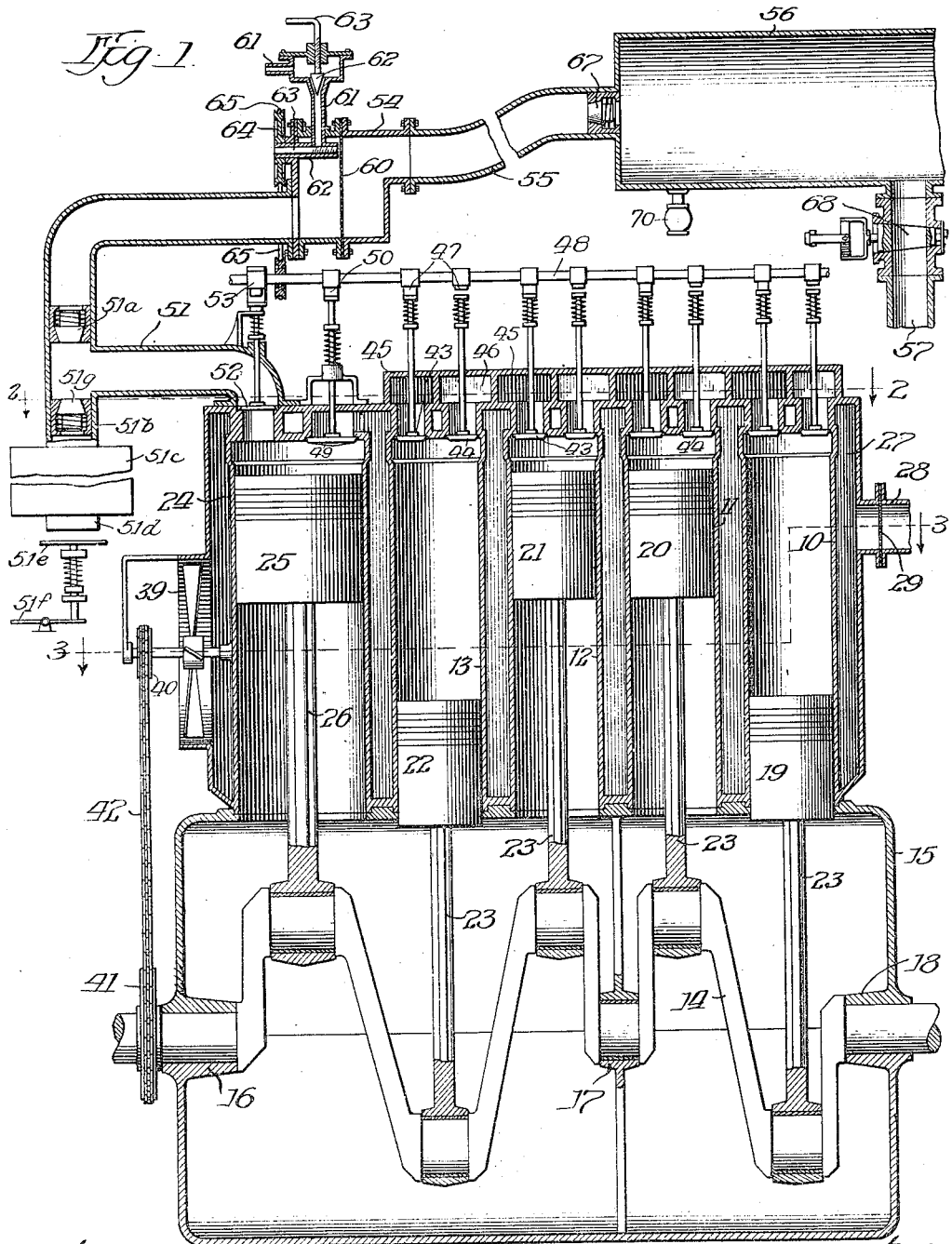

UNITED STATES PATENT OFFICE.

WILLIAM HART WASHBURNE, OF CHICAGO, ILLINOIS.

INTERNAL-COMBUSTION ENGINE.

1,257,162.	Specification of Letters Patent.	Patented Feb. 19, 1918.

Application filed June 3, 1916. Serial No. 101,436.

*To all whom it may concern:*

Be it known that I, WILLIAM HART WASHBURNE, a citizen of the United States, residing at Chicago, in the county of Cook and State of Illinois, have invented certain new and useful Improvements in Internal-Combustion Engines, of which the following is a specification.

My invention pertains to features of novelty and improvement in internal combustion engines or motors, and relates more particularly to betterment in the thermal efficiency of the appliance, the cooling of the device, the feed of the fuel, the homogeneity of the gaseous mixture delivered to the engine, the self starting of the engine, the power delivered by the motor, and the flexibility and cost of operation of the latter.

More specifically, it is the aim of this improved form of motor, to eliminate the use of the usual fan and radiator, to increase the power of the motor and decrease its cost of operation, to increase the mileage per unit of fuel, to reduce the quantity of fuel vaporized, to decrease the thermal loss from cooling and radiation, to supply pre-heated air as an ingredient of the gaseous mixture, to assure that all cylinders of the engine shall receive a full charge of the mixture under all conditions by feeding the mixture to the engine under pressure, to increase the compression of the mixture in the cylinders, to homogenize the mixture, to maintain a reserve supply of the mixture under pressure for starting purposes, and to improve the volatile capabilities of the fuel.

The attainment of these and other objects will be readily understood by those skilled in this art from a consideration of the following detailed description of preferred embodiments of the invention, which are also illustrated in the accompanying drawings throughout the various views of which like reference characters refer to the same parts.

In the drawings:

Figure 1 is a diagrammatic view of the appliance, some of the latter being illustrated in section, and in a certain sense the view may be considered as a substantially-central vertical cross-section through the engine and associated parts;

Fig. 2 is a cross-section on line 2—2 of Fig. 1;

Fig. 3 is a cross-section on line 3—3 of Fig. 1; and

Fig. 4 is a fragmentary vertical cross-section through the appliance illustrating a somewhat modified structure.

Referring to the device of Figs. 1, 2, and 3, it will be observed that the engine or motor in this particular embodiment is provided with four cylinders 10, 11, 12, and 13, preferably cast integrally or *en bloc*. As is usual the engine is equipped with a crank-shaft 14 housed in a casing 15 and revoluble in bearings 16, 17, and 18. The various engine pistons 19, 20, 21, and 22, by means of the customary connecting rods 23 are operatively associated with four of the crank-portions of the shaft.

Also cast integrally with the engine or motor cylinders, is another somewhat larger cylinder 24, constituting a portion of an air-pump or compressor, and accommodating a plunger 25 connected to a crank-portion of the shaft 14 by a suitable connecting-rod 26. It will be observed, therefore, that these five cylinders are parts of a single casting and the five pistons or plungers are, by means of their connecting rods, associated with the five crank-portions of the shaft.

Instead of having the usual water jacket around such cylinders, they are provided with a common air-jacket 27, the walls of which are a part of the casting referred to. The air for cooling these cylinders enters the front end of the jacket through a pipe or tube 28 equipped with a suitable dust screen 29. A portion of such cooling air is fed to the gaseous mixture by the air compressor in a manner described more fully hereinafter, the remainder of the air being exhausted or drawn through the air-jacket by means of a fan 39 whose shaft is supported in suitable bearings and driven in any approved manner, as by means of pulleys 40 and 41 on the fan and engine shafts respectively, around which a belt 42 takes in the usual manner.

Each of the motor or engine cylinders has an ignition apparatus of the usual kind, not shown, an inlet-valve 43, and an exhaust-valve 44, the inlet-valve being associated with an inlet manifold 45 and the discharge-valve being associated with an exhaust manifold 46. In the particular embodiment of the invention shown, all of these valves are actuated by suitable cams 47 on an overhead cam-shaft 48 driven from the main engine shaft in any approved manner, but not illustrated.

A spring-pressed valve 49 actuated by a cam 50 on the cam-shaft 48 is adapted at the proper timed intervals to establish and break communication between the interior of the compressor or pump cylinder 24 and the air-jacket surrounding the cylinders. The compressor is associated with a discharge pipe 51 and a spring-pressed exhaust-valve 52 also actuated by a cam 53 on shaft 48.

It should be clear, therefore, that upon the down stroke of the plunger 25 a charge of heated air is drawn into the cylinder 24 through the inlet-valve 49 and that upon the upstroke of the plunger this air is compressed and when its pressure reaches the desired point the discharge-valve 52 opens, permitting the delivery of the compressed air into the tube 51.

Tube or pipe 51 communicates with a vaporizer 54 which in turn, by means of a connecting-pipe 55, discharges the gaseous mixture into a homogenizing or storage compartment 56, the latter in turn by a pipe 57 delivering the mixture to the inlet manifold 45.

Pipe 51 is equipped with a spring-pressed check-valve 51$^a$ and a branch pipe 51$^b$ leading to a muffler 51$^c$, which ordinarily discharges a portion of the compressed-air into the atmosphere through an exhaust-pipe 51$^d$. Pipe 51$^b$ between the muffler and the main pipe 51 has a spring-pressed exhaust-valve 51$^g$ adjusted to a somewhat higher pressure than check-valve 51$^a$. At the end of the air-discharge pipe 51$^d$ a spring-pressed cap 51$^e$ is provided which by the action of the spring is normally retracted from the end of the pipe permitting a ready discharge of the escaping air to the outer atmosphere. It is provided, however, with a foot-lever 51$^f$, or what might be termed an accelerator, which when depressed causes the cap 51$^e$ to close the exhaust pipe, resulting in an increase of pressure in chamber 56.

The vaporizer or carbureter 54 is provided internally with a fine mesh, vertically-disposed, screen or reticulated fabric 60, down which the liquid fuel delivered thereto is adapted to trickle. The fuel, such as gasolene, comes to the vaporizer through a pipe or tube 61 supplied with a needle control valve 62 having a handle or upper portion 63 adapted for operation directly or by means of intermediate connections from the dashboard of the vehicle. The tube 51, at its lower end is in communication with a horizontal tube 62, the inner end of which terminates fairly closely adjacent to the screen 60. A screw-threaded rod or helically-grooved shaft 63 is rotatably accommodated in the tube 62, the latter forming a bearing therefor, and the outer protruding end of such rod or shaft has a grooved pulley 64 driven from the cam-shaft 48 by a coöperating belt 65 and another pulley 66 on such cam-shaft.

It should be clear, therefore, that since the cam-shaft is driven at a speed proportional to that of the engine and since the threaded or grooved shaft 63 is rotated by the cam-shaft, the feed of fuel delivered through the end of tube 62 to the screen 60 will be in direct ratio to the engine speed. Thus, the richness or leanness of the mixture is maintained substantially constant for all engine speeds provided the valve 62 is not manipulated.

The heated compressed air in passing through the screen 60 vaporizes the gasolene or other fuel, and the mixture then passes on through a spring-pressed check valve 67 into the homogenizing or storage compartment 56, which is of such capacity that it permits the mixture to become more homogenous or uniform than would otherwise be possible. Chamber 56 is equipped with a safety valve 70 set for a proper maximum pressure.

Pipe 57 has inserted therein a pressure-tight valve 68 which by suitable connections, not shown, may be turned, that is, opened and closed, from the dashboard of the vehicle.

Operation: The operation of the appliance is substantially as follows:

The outer air enters the air-jacket through the pipe 28 and the dust screen 29, being drawn through the air-jacket by the exhausting action of fan 39 and pump 24, 25. In thus passing around not only the engine cylinders, but also the compressor cylinder, the air acts to maintain these parts at a proper temperature for satisfactory operation of their working instrumentalities. A portion of this heated air is drawn into the compressor 24, 25, and is compressed and then delivered to compartment 56 through the vaporizer, where in passing through the screen 60 it becomes charged with or vaporizes the fuel, and is ultimately delivered under pressure to the engine cylinders through the inlet valves 43. Since such mixture is under pressure, it is assured that each cylinder will receive a proper and adequate charge under all conditions, thus tending to an economy in fuel and a balanced and efficient operation of the engine. By employing heated air for volatilizing the fuel a gaseous mixture better fitted for the economical running of the motor is secured and an economy in fuel consumption effected. By omitting a water jacket and its associated radiator, it is possible to run this engine at a higher temperature than water-cooled motors of the usual type, thus securing an increased efficiency, which is also heightened by reason of the fact that the ratio of fuel to air is predetermined to secure an operation of the appliance with a minimum of fuel consumption.

The excess air which does not pass through the vaporizer to the homogenizing pressure chamber is discharged through the muffler 51$^c$ and exhaust pipe 51$^d$. In case, however, it is desired that the engine shall speed up or have more power, this may be secured by pressing on the lever 51ᶠ causing an increase of pressure in chamber 56, with a resulting increase of pressure of the mixture feed to the motor. Of course, the operator also has control of the timing of the spark and the leanness or richness of the mixture by valve 62. As the engine speeds up, obviously, it will receive more fuel by reason of the faster speed of the fuel feeding shaft 63.

When the engine is to be stopped for any appreciable length of time, the operator closes the valve 68, thereby maintaining in the chamber 56 a substantial quantity of the gaseous mixture under pressure. When he desires to start the engine, he opens valve 68 and the mixture under pressure immediately passes to the cylinders, where it is ignited, and starts the engine without difficulty. If preferred, just previous to stopping the engine the driver may close cap 51ᵉ against the exhaust pipe 51ᵈ, thus increasing the pressure of the mixture stored in compartment 56 which will be limited by the possible opening action of safety valve 70.

It should be obvious, therefore, that since the usual fan and radiator are eliminated, since heated air from the jacket is compressed and delivered to the vaporizer for volatilizing the fuel, the quantity of fuel required is reduced, the power of the motor is increased, and the cost of operation lessened. Since the mixture is delivered to the cylinders under pressure, a more uniform and satisfactory operation of the engine is secured under all conditions, particularly under slow running, or, stated differently, the flexibility of the engine is increased. It should be noted further that since the mixture is carried to the cylinders under pressure and there secures further compression, a higher total compression may be employed, resulting in the possibility of using a leaner mixture with the obvious saving in fuel consumption. A further saving is effected by permitting the mixture to become more homogenous in the chamber, thus bringing about a more complete and effectual combustion of the fuel. The use of the storage compartment or chamber also obviates the requirement of a storage battery for starting purposes, since the mixture under pressure, can be readily delivered to the engine cylinders as soon as it is desired to start the motor, thus not depending upon the suction of the moving pistons to draw in the required charge. The properly mixed gas and air is ready to enter the engine cylinders as soon as permitted to do so, it not being required to vaporize the gasolene under disadvantageous circumstances when the motor is first set into operation.

Instead of having the air for cooling the cylinders enter the air jacket at a single point, as in the construction of Figs. 1, 2, and 3, the outer wall of such jacket may be perforated or apertured at a plurality of points so that at these various places a smaller quantity of air will enter the jacket and possibly more effectually perform the cooling function. In Fig. 4 a modification of this character has been illustrated, in which the jacket is provided with a number of air inlets 100. Otherwise, the constructions are substantially the same.

While I have herein presented two embodiments of the invention, it is to be appreciated that the invention is susceptible of a variety of embodiments and that many minor mechanical changes may be made in the structures shown and described without departure from the substance and heart of the invention and without the sacrifice of any of its substantial benefits and advantages.

I claim:

1. In an appliance of the character described, the combination of an internal-combustion engine, means to feed an explosive-mixture under pressure to the engine, and means to vary such pressure, substantially as described.

2. In an appliance of the character described, the combination of an internal-combustion engine, means to feed an explosive-mixture under pressure to the engine, and manually-operable means to vary such pressure, substantially as described.

3. In an appliance of the character described, the combination of an internal-combustion engine, means to feed an explosive-mixture under pressure greater than atmospheric to the engine, and means to vary said pressure, substantially as described.

4. In an appliance of the character described, the combination of an internal-combustion engine, means to feed an explosive-mixture to the engine under pressure greater than atmospheric, and manually-operable means to vary such pressure, substantially as described.

5. In an appliance of the character described, the combination of an internal-combustion engine, means to cool said engine with air, means to supply at least a portion of said heated air under pressure as an ingredient of the fuel mixture consumed in the engine, and manually-controlled means to vary said pressure, substantially as described.

6. In an appliance of the character described, the combination of an internal-combustion engine, means to cool said engine with air, an air-pump to cause the circulation of cooling air at the engine and deliver at least a portion of such heated air under pressure as an ingredient to the fuel mixture consumed in the engine, and manually-controlled means to vary said pressure, substantially as described.

7. In an appliance of the character described, the combination of an internal-combustion engine, means to pump a fuel mixture under pressure to the engine for consumption therein in quantity substantially proportional to the speed of the engine, and manually-controlled means to govern said pressure, substantially as described.

8. In an appliance of the character described, the combination of an internal-combustion engine, means driven by the engine adapted to pump a fuel-mixture under pressure to the engine for consumption therein in quantity substantially proportional to the speed of the engine, and manually-controlled means to vary said pressure, substantially as described.

9. In an appliance of the character described, the combination of an internal-combustion engine, means to pump at least one ingredient of the fuel-mixture under pressure to the engine for consumption therein in quantity substantially proportional to the speed of the engine, and manually-controlled means to vary said pressure, substantially as described.

10. In an appliance of the character described, the combination of an internal-combustion engine, means to feed individually a plurality of ingredients to the fuel-mixture for consumption in the engine in quantity substantially proportional to the speed of the engine, one of said ingredients being fed under pressure, and manually controlled means to vary said pressure, substantially as described.

11. In an appliance of the character described, the combination of an internal-combustion engine, a pump to feed fuel to the engine for consumption therein in quantity proportional to the speed of the engine, a pump to feed air under pressure to the engine for consumption therein in quantity substantially proportional to the speed of the engine, and means to vary said pressure, substantially as described.

12. In an appliance of the character described, the combination of an internal-combustion engine, means driven by the engine adapted to pump to the fuel-mixture for consumption in the engine a plurality of ingredients for the mixture in quantity substantially proportional to the speed of the engine, one of said ingredients being fed under pressure greater than atmospheric, and manually controlled means to vary said pressure, substantially as described.

13. In an appliance of the character described, the combination of an internal-combustion engine, means to cool said engine with air, means to pump at least a portion of said heated air under pressure to the fuel-mixture to be consumed in the engine in quantity substantially proportional to the speed of the engine, and manually-controlled means to vary said pressure, substantially as described.

14. In an appliance of the character described, the combination of an internal-combustion engine, means to cool said engine with air, means to mix fuel and at least a portion of the heated air, an homogenizing chamber, means to maintain a quantity of the fuel mixture to be consumed in the engine under pressure in said chamber, and means to deliver the mixture from said chamber to the engine, substantially as described.

15. In an appliance of the character described, the combination of an internal-combustion engine, means to cool said engine with air, means to mix fuel and at least a portion of the heated air, an homogenizing chamber, means to maintain a quantity of the fuel mixture to be consumed in the engine under pressure in said chamber, means to deliver the mixture from said chamber to the engine, and manually-controlled means to vary the pressure in said homogenizing chamber, substantially as described.

16. In an appliance of the character described, the combination of an internal-combustion engine, means to cool said engine with air, means to feed fuel, an homogenizing chamber, an air-pump to cause a circulation of cooling air at the engine, deliver at least a portion of such heated air to the fuel, and maintain a quantity of the fuel-mixture to be consumed in the engine in said homogenizing chamber under pressure, and means to deliver the mixture from said chamber to the engine, substantially as described.

17. In an appliance of the character described, the combination of an internal-combustion engine, means to cool said engine with air, means to feed fuel, an homogenizing chamber, an air-pump to cause a circulation of cooling air at the engine, deliver at least a portion of such heated air to the fuel, and maintain a quantity of the fuel-mixture to be consumed in the engine in said homogenizing chamber under pressure, means to deliver the mixture from said chamber to the engine, and manually-controlled means to vary the pressure of the mixture fed to the engine, substantially as described.

18. In an apparatus of the character described, the combination of an internal-combustion engine, an homogenizing chamber, means to deliver the contents of said chamber to the engine under pressure for combustion therein, means to feed a fuel mixture to said chamber in quantity substantially proportional to the speed of the engine, and manually-controlled means to vary said pressure, substantially as described.

19. In an appliance of the character described, the combination of an internal-combustion engine having a cylinder, an air-pump having a cylinder, said cylinders having parallel axes but not a common axis, the walls of said cylinders being hollow and cast integral to afford an air-jacket around the cylinders, the pump causing a circulation of air through said jacket, substantially as described.

20. In an appliance of the character described, the combination of an internal-combustion engine including a cylinder, a piston, a crank-shaft, and means connecting said piston and crank-shaft, and an air-pump including a cylinder, a plunger, and means connecting said plunger to a crank-portion of said engine-shaft, said engine and pump cylinders being integral with hollow walls affording a common air-jacket and having parallel axes but not a common axis, said pump causing a circulation of air through said air-jacket, substantially as described.

21. In an appliance of the character described, the combination of an internal-combustion engine having an air-jacket around its cylinder, an air-pump including a cylinder integral with the engine cylinder, said air-pump causing air to pass through said jacket and be delivered under pressure to the fuel mixture consumed in the engine, and manually-controlled means to vary said pressure, substantially as described.

22. In an appliance of the character described, the combination of an internal-combustion engine having an air-jacket around its cylinder, an air-pump causing air to pass through said jacket and be delivered under pressure to the fuel mixture consumed in the engine, and manually-controlled means to vary said pressure, substantially as described.

23. In an appliance of the character described, the combination of an internal-combustion engine having an air-jacket around its cylinder, a crank-shaft, a piston in said cylinder, and means connecting said piston to the crank-shaft, an air-pump including a cylinder integral with the engine cylinder, a plunger, and means connecting said plunger to a crank-portion of said engine-shaft, said air-pump causing air to pass through said jacket and be delivered under pressure to the fuel mixture consumed in the engine, and manually-controlled means to vary said pressure, substantially as described.

24. In an appliance of the character described, the combination of an internal-combustion engine having an air-jacket around its cylinder, a piston, a crank-shaft, and means connecting said piston to the crank-shaft, an air-pump including a cylinder, a plunger in said cylinder, and means connecting said plunger to a crank-portion of said engine-shaft, said air-pump causing air to pass through said jacket and be delivered under pressure to the fuel-mixture consumed in the engine, and manually-controlled means to vary said pressure, substantially as described.

25. In an appliance of the character described, the combination of an internal-combustion engine having an air-jacket around its cylinder, said jacket having a plurality of inlet-ports, an air-pump causing the air to pass through said jacket and be delivered under pressure to the fuel-mixture consumed in the engine, and manually-controlled means to vary said pressure, substantially as described.

26. In an appliance of the character described, the combination of an internal-combustion engine having an air-jacket around its cylinder, said jacket having a plurality of inlet-openings, an air-pump including a cylinder integral with the engine cylinder, said air-pump causing air to pass through said jacket to be delivered under pressure to the fuel-mixture consumed in the engine, and manually-controlled means to vary said pressure, substantially as described.

27. In an appliance of the character described, the combination of an air-jacketed internal-combustion engine, an air-pump constructed to draw air through said jacket, compress such air, and deliver it under pressure as an ingredient to the fuel mixture consumed in the engine, and manually-controlled means to vary said pressure, substantially as described.

28. In an appliance of the character described, the combination of an air-jacketed internal-combustion engine, an air-pump constructed to draw air through said jacket, compress such air, and deliver it under pressure in quantity substantially proportional to the engine speed as an ingredient of the fuel mixture consumed in the engine, and manually-controlled means to vary said pressure, substantially as described.

29. In an appliance of the character described, the combination of an air-jacketed internal-combustion engine, a carbureter associated with said engine, means to deliver liquid fuel to said carbureter, an air-pump adapted to circulate air through said air-jacket and deliver at least a portion of it to said carbureter under pressure for the vaporization of said fuel, and means to vary said pressure, substantially as described.

30. In an appliance of the character described, the combination of an air-jacketed internal-combustion engine, a carbureter associated with said engine, means to deliver liquid fuel to said carbureter, an air-pump adapted to circulate air through said jacket, compress said air and deliver it under pressure to said carbureter for the vaporization of said fuel, and manually-controlled means to vary said pressure, substantially as described.

31. In an appliance of the character described, the combination of an air-jacketed internal-combustion engine, a carbureter associated with said engine, means to deliver liquid fuel to said carbureter, an air-pump adapted to circulate air through said air-jacket and deliver it under pressure to said carbureter for the vaporization of said fuel, means to actuate said pump at a speed proportional to the speed of the engine, and means to vary said pressure, substantially as described.

32. In an appliance of the character described, the combination of an air-jacketed internal-combustion engine, a carbureter associated with said engine, means to deliver liquid fuel to said carbureter, an air-pump adapted to circulate air through said air-jacket, compress said air, and deliver it under pressure to said carbureter for the vaporization of said fuel, means to actuate said pump at a speed substantially proportional to that of the engine, and manually-controlled means to vary said pressure substantially as described.

33. In an appliance of the character described, the combination of an internal-combustion engine, a carbureter associated with said engine, means to deliver liquid fuel to said carbureter, an air-pump adapted to compress air and deliver it under pressure to said carbureter for the vaporization of said fuel, and means to vary said pressure, substantially as described.

34. In an appliance of the character described, the combination of an internal-combustion engine, a carbureter associated with said engine, means to deliver liquid fuel to said carbureter, an air-pump adapted to compress air and deliver it under pressure to said carbureter for the vaporization of said fuel, means to actuate said pump at a speed substantially proportional to that of the engine, and manually-controlled means to vary said pressure, substantially as described.

35. In an appliance of the character described, the combination of an internal-combustion engine, a reticulated evaporation member, means to feed liquid fuel thereto so that the fuel may flow over said member, means to actuate said feeding means proportionally to the speed of the engine, and means to pass air through said member, causing the vaporization of said fuel, substantially as described.

36. In an appliance of the character described, the combination of an internal-combustion engine, a reticulated evaporation member, a screw-feed to deliver liquid fuel to said member so that the fuel may flow over the member, means to actuate said screw-feed by the engine at a speed substantially proportional to that of the engine, and means to pass air through said evaporation member, causing the vaporization of the fuel, substantially as described.

37. In an appliance of the character described, the combination of an internal-combustion, air-jacketed engine, a reticulated evaporation member, means to feed a liquid fuel thereto so that the fuel may flow over said member, means to pass air through said engine jacket and through said member causing the vaporization of said fuel, substantially as described.

38. In an appliance of the character described, the combination of an internal-combustion, air-jacketed engine, a reticulated evaporation member, means to feed liquid fuel thereto so that the fuel may flow over said member, and means to pass air through said engine jacket and under pressure through said evaporation member, causing the vaporization of said fuel, substantially as described.

39. In an appliance of the character described, the combination of an internal-combustion engine, an air-pump, means to deliver a portion of the air acted upon by said pump as an ingredient to the explosive mixture consumed in the engine, means to deliver another portion of said pumped air to the atmosphere, and means operable at will to prevent the discharge of such portion to the atmosphere, thus compelling it to be delivered to said mixture, substantially as described.

40. In an appliance of the character described, the combination of an air-jacketed internal-combustion engine, an air-pump adapted to receive heated air from said jacket, means to deliver a portion of the air acted upon by said pump as an ingredient to the explosive mixture consumed in the engine, means to deliver another portion of said pumped air to the atmosphere, and means operable at will to prevent the discharge of such portion to the atmosphere, thus compelling it to be delivered to said mixture, substantially as described.

41. In an appliance of the character described, the combination of an internal-combustion engine, a pressure-chamber, a connection between said chamber and engine, an air-pump, means to deliver a portion of the air acted upon by said pump under pressure to said pressure-chamber as an ingredient to the explosive mixture to be consumed in the engine, means to deliver another portion of said pumped air to the atmosphere, and means operable at will to prevent the discharge of such portion to the atmosphere, thus compelling it to be delivered under pressure to said mixture in the pressure-chamber, substantially as described.

42. In an appliance of the character described, the combination of an air-jacketed internal-combustion engine, a pressure-chamber, means to deliver the contents of said chamber to said engine, an air-pump adapted to receive heated air from said jacket, means to deliver a portion of the air acted upon by said pump under pressure to said pressure-chamber as an ingredient to the explosive mixture to be consumed in the engine, means to discharge another portion of said pumped air to the atmosphere, and means operable at will to prevent the discharge of such portion to the atmosphere, thus compelling it to be delivered under pressure to the mixture in said pressure-chamber, substantially as described.

43. In an appliance of the character described, the combination of an air-cooled, internal-combustion engine, means to deliver to the atmosphere a portion of the cooling air heated by said engine, and means to deliver a portion of the heated air as an ingredient to the explosive mixture to be consumed in the engine, substantially as described.

44. In an appliance of the character described, the combination of an air-cooled internal-combustion engine, a rotary-fan to deliver to the atmosphere a portion of the cooling air heated by the engine, and a reciprocating pump to deliver a portion of the cooling air as an ingredient to the explosive mixture to be consumed in the engine, substantially as described.

45. In an appliance of the character described, the combination of an air-cooled internal-combustion engine, a rotary-fan to deliver to the atmosphere a portion of the cooling air heated by said engine, a reciprocating pump to deliver a portion of the heated cooling air under pressure as an ingredient to the explosive mixture to be consumed in the engine, and means to vary said pressure, substantially as described.

WILLIAM HART WASHBURNE.